United States Patent
Fukuri

(10) Patent No.: US 12,043,577 B2
(45) Date of Patent: Jul. 23, 2024

(54) ASPHALT COMPOSITION

(71) Applicant: KAO CORPORATION, Tokyo (JP)

(72) Inventor: Norihiro Fukuri, Ichikawa (JP)

(73) Assignee: KAO CORPORATION, Tokyo (JP)

(*) Notice: Subject to any disclaimer, the term of this patent is extended or adjusted under 35 U.S.C. 154(b) by 700 days.

(21) Appl. No.: 17/096,207

(22) Filed: Nov. 12, 2020

(65) Prior Publication Data
US 2021/0147295 A1    May 20, 2021

Related U.S. Application Data

(60) Provisional application No. 62/936,759, filed on Nov. 18, 2019.

(51) Int. Cl.
*C04B 26/26*    (2006.01)
*C04B 18/02*    (2006.01)
*C04B 24/28*    (2006.01)

(52) U.S. Cl.
CPC .............. *C04B 26/26* (2013.01); *C04B 18/02* (2013.01); *C04B 24/283* (2013.01)

(58) Field of Classification Search
CPC ....... C04B 26/26; C04B 18/02; C04B 24/283; C08L 95/00
See application file for complete search history.

(56) References Cited

U.S. PATENT DOCUMENTS

2019/0359827 A1* 11/2019 Shirai .................. E01C 7/30

FOREIGN PATENT DOCUMENTS

WO    WO2019/017334 A1    1/2019

* cited by examiner

*Primary Examiner* — Robert D Harlan
(74) *Attorney, Agent, or Firm* — Birch, Stewart, Kolasch & Birch, LLP

(57) ABSTRACT

The present invention relates to an asphalt composition containing asphalt and a polyester, wherein the polyester includes an alcohol component-derived structural unit including an alkylene oxide adduct of bisphenol A and an alkylene glycol compound having 3 or more carbon atoms (exclusive of the alkylene oxide adduct of bisphenol A).

10 Claims, No Drawings

ASPHALT COMPOSITION

CROSS-REFERENCE TO RELATED APPLICATIONS

The present application claims the benefit of Provisional Application No. 62/936,759 filed on Nov. 18, 2019, the disclosure of which is hereby incorporated by reference in its entirety.

FIELD OF THE INVENTION

The present invention relates to an asphalt composition to be used for road pavement and an asphalt mixture.

BACKGROUND OF THE INVENTION

An asphalt pavement using an asphalt composition has been frequently performed for paving driveways, parking spaces, cargo yards, sidewalks, etc., because of relatively easy construction and a short period of time from beginning of paving works to traffic start.

The asphalt pavement includes a road surface which is formed of an asphalt mixture containing aggregates bonded with each other through asphalt, and hence, paved roads exhibit good hardness and durability.

However, a rut of a wheel or a crack is generated on the asphalt pavement surface due to long-term use. Therefore, in such a case, repair of the pavement is inevitably needed, which results in increased maintenance costs and significant influence on car traffic.

WO 2019/017334 A discloses an asphalt composition which is excellent in durability of a paved surface after laying and which contains asphalt, a thermoplastic elastomer, and a polyester, wherein the polyester has a softening point of 90° C. or higher and 140° C. or lower and a glass transition point of 40° C. or higher and 80° C. or lower, and a ratio of the polyester is 1 part by mass or more and 17 parts by mass or less based on 100 parts by mass of the asphalt.

SUMMARY OF THE INVENTION

The present invention is concerned with the following [1] to [3].
- [1] An asphalt composition containing asphalt and a polyester, wherein the polyester includes an alcohol component-derived structural unit including an alkylene oxide adduct of bisphenol A and an alkylene glycol compound having 3 or more carbon atoms (exclusive of the alkylene oxide adduct of bisphenol A).
- [2] An asphalt mixture containing the asphalt composition as set forth in the above [1] and an aggregate.
- [3] A method for producing an asphalt mixture, including a step of mixing a heated aggregate, asphalt, and a polyester, wherein the polyester includes an alcohol component-derived structural unit including an alkylene oxide adduct of bisphenol A and an alkylene glycol compound having 3 or more carbon atoms (exclusive of the alkylene oxide adduct of bisphenol A).

DETAILED DESCRIPTION OF THE INVENTION

In the conventional asphalt pavement, if the asphalt content is high, though cracking is generated a little, rutting is likely generated, whereas if the asphalt content is low, though rutting is generated a little, cracking is likely generated.

The present invention relates to an asphalt composition which makes it possible to achieve asphalt pavement in which the generation of both rutting and cracking is suppressed and an asphalt mixture.

Asphalt Composition

The asphalt composition of the present invention (hereinafter also referred to simply as "asphalt composition") contains asphalt and a polyester. The polyester includes an alcohol component-derived structural unit including an alkylene oxide adduct of bisphenol A and an alkylene glycol compound having 3 or more carbon atoms (exclusive of the alkylene oxide adduct of bisphenol A). In addition, the asphalt composition of the present invention is a blend of asphalt and a polyester. The polyester includes an alcohol component-derived structural unit including an alkylene oxide adduct of bisphenol A and an alkylene glycol compound having 3 or more carbon atoms (exclusive of the alkylene oxide adduct of bisphenol A).

The present inventors have found that by containing a specified polyester in the asphalt composition, the generation of both rutting and cracking of an asphalt pavement obtained using the foregoing asphalt composition is suppressed.

Although a detailed mechanism in which the effects of the present invention are obtained is not always elucidated yet, a part thereof may be considered as follows. That is, in view of the fact that the polyester has a structural unit derived from an alkylene oxide adduct of bisphenol A, it may be presumed that the polyester and asphaltene in the asphalt interact with each other to form a high-strength polyester-asphaltene complex, and as a result, rutting of the asphalt pavement can be suppressed. In addition, in view of the fact that the polyester has a structural unit derived from an alkylene glycol compound having 3 or more carbon atoms, it may be presumed that softness is given to the polyester, and stress relaxation is improved, and as a result, the generation of cracking of the asphalt pavement can be suppressed. Furthermore, in view of the fact that the polyester has a structural unit derived from an alkylene glycol compound having 3 or more carbon atoms, it may be presumed that a hydrophilic moiety of the polyester makes the asphalt and the aggregate firmly connect with each other to improve bonding strength between the asphalt and the aggregate, and as a result, the generation of both rutting and cracking of the asphalt pavement can be suppressed. In the case where the alkylene glycol is used as a polyalkylene glycol but not a monomer, in view of the fact that not only it has a hydrophilic moiety, but also its segment having softness is dispersed in the polyester, the generation of rutting and cracking can be suppressed on a higher level.

The "rutting" means concaves and convexes produced continuously in the longitudinal direction in a road travelling part when in temperature rise in summer or the like, an asphalt layer forming a paved surface flows. The rutting is correlated with plastic flow resistance of the asphalt composition that is a binder of the asphalt pavement, and according to SUPERPAVE's binder standard (Japan Road Association, Pavement Test Method Handbook, separate volume, 1996), it is possible to evaluate it in terms of $G^*/\sin \delta$ of the asphalt composition (binder). Here, $G^*$ represents a complex elastic modulus, and $G^*$ and $\sin \delta$ are measured by a rheometer.

Since the larger the value of G*/sin δ, the larger the plastic flow resistance is, it is evaluated that the asphalt composition can provide an asphalt pavement having excellent rutting resistance.

Meanwhile, the "cracking" is a phenomenon in which the paved surface is cracked by repeated load. It is possible to evaluate the cracking resistance by an I-FIT device. With respect to the I-FIT (Illinois flexibility index test), the descriptions of Nathan D. Moore, "Evaluation of Laboratory Cracking Tests Related to Top-Down Cracking in Asphalt Pavements", Auburn University (2016) and https://theasphaltpro.com/articles/how-to-perform-i-fit/can be hereby incorporated by reference. Specifically, by preparing a semicircular specimen and then measuring its breaking energy with the I-FIT device, the cracking resistance can be evaluated. An index of the cracking resistance is evaluated in terms of an FI (flexibility index) value. The FI value can be calculated according to the following equation:

$$FI = A \times \frac{G_f}{|m|}$$

wherein FI is a flexibility index; $G_f$ is a fracture energy (J/m$^2$); m is an inflection point of the post-peak load vs. displacement curve; and A is scaling factor (0.01).

Definitions and so on regarding various terminologies in this specification are hereunder described.

The "binder mixture" means a mixture including asphalt and a thermoplastic elastomer and is, for example, a concept inclusive of asphalt modified with a thermoplastic elastomer as mentioned later (hereinafter also referred to as "modified asphalt").

In the polyester, an "alcohol component-derived structural unit" means a structure resulting from eliminating a hydrogen atom from a hydroxy group of the alcohol component, and a "carboxylic acid component-derived structural unit" means a structure resulting from eliminating a hydroxy group from a carboxy group of the carboxylic acid component.

A "carboxylic acid compound" has a concept inclusive of not only a carboxylic acid thereof but also an anhydride which is decomposed during the reaction to form an acid and an alkyl ester of carboxylic acid (for example, the carbon number of the alkyl group is 1 or more and 3 or less). In the case where the carboxylic acid compound is an alkyl ester of carboxylic acid, the carbon number of the alkyl group that is an alcohol residue of the ester is not calculated for the carbon number of the carboxylic acid compound.

Asphalt

The asphalt composition of the present invention contains asphalt.

As the asphalt, various kinds of asphalts can be used. Examples thereof include, in addition to straight asphalt that is petroleum asphalt for pavement, modified asphalt. Examples of the modified asphalt include blown asphalt; and asphalt modified with a polymer material, such as a thermoplastic elastomer and a thermoplastic resin. The straight asphalt refers to a residual bituminous material obtained by treating a crude oil with an atmospheric distillation apparatus, a vacuum distillation apparatus, or the like. In addition, the blown asphalt means asphalt obtained by heating a mixture of straight asphalt and a heavy oil and then blowing air to undergo oxidation. From the viewpoint of rutting resistance and cracking resistance, modified asphalt is preferred, and from the viewpoint of versatility, straight asphalt is preferred.

Thermoplastic Elastomer

From the viewpoint of rutting resistance and cracking resistance, it is preferred that the asphalt composition contains a thermoplastic elastomer. The asphalt and the thermoplastic elastomer are preferably used as a binder mixture that is a mixture thereof. Examples of the binder mixture include straight asphalt modified with a thermoplastic elastomer (modified asphalt).

As the thermoplastic elastomer, there is exemplified at least one selected from the group consisting of a styrene/butadiene block copolymer (hereinafter also referred to simply as "SB"), a styrene/butadiene/styrene block copolymer (hereinafter also referred to simply as "SBS"), a styrene/butadiene random copolymer (hereinafter also referred to simply as "SBR"), a styrene/isoprene block copolymer (hereinafter also referred to simply as "SI"), a styrene/isoprene/styrene block copolymer (hereinafter also referred to simply as "SIS"), a styrene/isoprene random copolymer (hereinafter also referred to simply as "SIR"), an ethylene/vinyl acetate copolymer, and an ethylene/acrylic acid ester copolymer.

Examples of a commercially available product of the ethylene/acrylic acid ester copolymer include "Elvaroy" (manufactured by DuPont de Nemours, Inc.).

Of these thermoplastic elastomers, from the viewpoint of more improving the rutting resistance and the cracking resistance, at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer is preferred; and at least one selected from the group consisting of a styrene/butadiene random copolymer and a styrene/butadiene/styrene block copolymer is more preferred.

From the viewpoint of more improving the rutting resistance and the cracking resistance, the content of the thermoplastic elastomer in the asphalt composition is preferably 0.1% by mass or more, more preferably 0.5% by mass or more, still more preferably 1% by mass or more, and yet still more preferably 2% by mass or more, and it is preferably 30% by mass or less, more preferably 20% by mass or less, still more preferably 10% by mass or less, and yet still more preferably 5% by mass or less, in 100% by mass of the asphalt composition.

In the asphalt composition, from the viewpoint of more improving the rutting resistance and the cracking resistance, a ratio of the thermoplastic elastomer is preferably 0.1 parts by mass or more, more preferably 0.5 parts by mass or more, still more preferably 1 part by mass or more, and yet still more preferably 2 parts by mass or more, and it is preferably 30 parts by mass or less, more preferably 20 parts by mass or less, still more preferably 10 parts by mass or less, and yet still more preferably 5 parts by mass or less based on 100 parts by mass of the asphalt.

From the viewpoint of rutting resistance and cracking resistance and the viewpoint of exhibiting an asphalt performance, the content or blending amount of the asphalt in the asphalt composition of the present invention is preferably 60% by mass or more, more preferably 70% by mass or more, still more preferably 75% by mass or more, and yet still more preferably 80% by mass or more, and it is preferably 98% by mass or less, more preferably 96% by mass or less, and still more preferably 95% by mass or less, in 100% by mass of the asphalt composition.

Polyester

The asphalt composition of the present invention contains a polyester. From the viewpoint of suppressing the generation of both rutting and cracking of the asphalt pavement, the polyester includes an alcohol component-derived structural unit including an alkylene oxide adduct of bisphenol A and an alkylene glycol compound having 3 or more carbon atoms (exclusive of the alkylene oxide adduct of bisphenol A).

Alcohol Component

From the viewpoint of obtaining excellent rutting resistance and cracking resistance, the alcohol component includes an alkylene oxide adduct of bisphenol A, and preferably includes an alkylene oxide adduct of bisphenol A represented by the following formula (I);

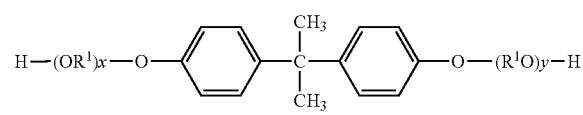

(I)

wherein $OR^1$ and $R^1O$ each represent an alkylene oxide; $R^1$ represents an alkylene group having 2 or 3 carbon atoms; x and y each represent a positive number expressing an average addition molar number of the alkylene oxide; and a sum total of x and y is preferably 1 or more, and more preferably 1.5 or more, and it is preferably 16 or less, more preferably 8 or less, and still more preferably 4 or less.

Examples of the alkylene oxide adduct of bisphenol A represented by the formula (I) include a propylene oxide adduct of bisphenol A [2,2-bis(4-hydroxyphenyl)propane] and an ethylene oxide adduct of bisphenol A. These alkylene oxide adducts of bisphenol A can be used alone or in combination of two or more thereof.

From the viewpoint of more improving the rutting resistance and the cracking resistance, the average addition molar number of ethylene oxide in the ethylene oxide adduct of bisphenol A is preferably 1.8 or more, and more preferably 2.0 or more, and it is preferably 2.6 or less, and more preferably 2.4 or less.

From the viewpoint of more improving the rutting resistance and the cracking resistance, the average addition molar number of propylene oxide in the propylene oxide adduct of bisphenol A is preferably 2.0 or more, more preferably 2.4 or more, and still more preferably 2.6 or more, and it is preferably 3.0 or less, and more preferably 2.9 or less.

From the viewpoint of more improving the rutting resistance and the cracking resistance, a molar ratio of the propylene oxide adduct of bisphenol A to the ethylene oxide adduct of bisphenol A is preferably 10/90 or more, more preferably 20/80 or more, and still more preferably 25/75 or more, and from the viewpoint of more improving the rutting resistance and the cracking resistance, the foregoing molar ratio is preferably 70/30 or less, more preferably 60/40 or less, and still more preferably 50/50 or less.

From the viewpoint of not only enhancing melt-dispersibility in the asphalt but also obtaining excellent rutting resistance and cracking resistance, the content or blending amount of the alkylene oxide adduct of bisphenol A in the alcohol component is preferably 70 mol % or more, more preferably 75 mol % or more, and still more preferably 80 mol % or more, and it is preferably 98.5 mol % or less, more preferably 97 mol % or less, and still more preferably 96 mol % or less, in 100 mol % of the alcohol component.

From the viewpoint of obtaining excellent rutting resistance and cracking resistance, the alcohol component includes an alkylene glycol compound having 3 or more carbon atoms (exclusive of the alkylene oxide adduct of bisphenol A). The alkylene glycol compound having 3 or more carbon atoms is preferably at least one selected from the group consisting of an alkylene glycol and a polyalkylene glycol.

The alkylene glycol is preferably an alkylene glycol having 3 or more and 20 or less carbon atoms (namely, an aliphatic diol having 3 or more and 20 or less carbon atoms), and examples thereof include propylene glycol (1,2-propanediol), trimethylene glycol (1,3-propanediol), tetramethylene glycol (1,4-butanediol), 1,5-pentanediol, 1,6-hexanediol, 1,4-butenediol, 1,3-butanediol, neopentyl glycol, 1,10-decanediol, and 1,12-dodecanediol. These can be used alone or in combination of two or more thereof.

Examples of the polyalkylene glycol (namely, a polyether glycol) include polypropylene glycol, polytrimethylene ether glycol, polytetramethylene ether glycol, polyoxyethylene-polyoxypropylene glycol, polyoxyethylene-polyoxytetramethylene glycol, and polyoxypropylene-polyoxytetramethylene glycol.

From the viewpoint of obtaining excellent rutting resistance and cracking resistance, a molecular weight of the alkylene glycol compound is preferably 200 or more, more preferably 300 or more, and still more preferably 350 or more, and it is preferably 1,000 or less, more preferably 800 or less, still more preferably 700 or less, and yet still more preferably 600 or less.

From the viewpoint of obtaining excellent rutting resistance and cracking resistance, the alkylene glycol compound is preferably at least one selected from the group consisting of propylene glycol and polypropylene glycol.

From the viewpoint of not only enhancing melt-dispersibility in the asphalt but also obtaining excellent rutting resistance and cracking resistance, the content or blending amount of the alkylene glycol compound in the alcohol component is preferably 1.5 mol % or more, more preferably 3 mol % or more, and still more preferably 4 mol % or more, and it is preferably 30 mol % or less, more preferably 25 mol % or less, still more preferably 20 mol % or less, and yet still more preferably 10 mol % or less, in 100 mol % of the alcohol component.

A molar ratio of the alkylene oxide adduct of bisphenol A to the alkylene glycol compound [(alkylene oxide adduct of bisphenol A)/(alkylene glycol compound)] is preferably 70/30 or more, more preferably 80/20 or more, still more preferably 85/15 or more, and yet still more preferably 90/10 or more, and it is preferably 99.5/0.5 or less, more preferably 99/1 or less, still more preferably 98/2 or less, and yet still more preferably 97/3 or less.

The alcohol component may include other alcohol, and for example, an aromatic diol, a trivalent or higher-valent polyhydric alcohol, or the like. Examples of the trivalent or higher-valent polyhydric alcohol include glycerin.

Carboxylic Acid Component

The polyester typically includes a carboxylic acid component-derived structural unit. Examples of the carboxylic acid component include aliphatic dicarboxylic acid compounds, aromatic dicarboxylic acid compounds, and trivalent or higher-valent and hexavalent or lower-valent carboxylic acid compounds. These carboxylic acid components can be used alone or in combination of two or more thereof.

From the viewpoint of more improving the rutting resistance and the cracking resistance, the carbon number of the main chain of the aliphatic dicarboxylic acid is preferably 3 or more, and more preferably 4 or more, and it is preferably 10 or less, and more preferably 8 or less.

Examples of the aliphatic dicarboxylic acid compound include fumaric acid, maleic acid, oxalic acid, malonic acid, citraconic acid, itaconic acid, glutaconic acid, succinic acid, adipic acid, suberic acid, azelaic acid, sebacic acid, dodecane diacid, and a succinic acid substituted with an alkyl group having 1 or more and 20 or less carbon atoms or an alkenyl group having 2 or more and 20 or less carbon atoms, and anhydrides or alkyl esters (for example, the carbon number of the alkyl group is 1 or more and 3 or less) thereof. Examples of the substituted succinic acid include dodecyl succinic acid, dodecenyl succinic acid, and octenyl succinic acid. Of the foregoing aliphatic dicarboxylic acid compounds, at least one selected from the group consisting of fumaric acid, maleic acid, and adipic acid is preferred, and adipic acid is more preferred.

Examples of the aromatic dicarboxylic acid compound include phthalic acid, isophthalic acid, terephthalic acid, and naphthalenedicarboxylic acid, and anhydrides or alkyl esters (for example, the carbon number of the alkyl group is 1 or more and 3 or less) thereof. Of the foregoing aromatic dicarboxylic acid compounds, from the viewpoint of rutting resistance and cracking resistance, isophthalic acid and terephthalic acid are preferred, and terephthalic acid is more preferred.

The trivalent or higher-valent and hexavalent or lower-valent carboxylic acid compound is preferably a trivalent carboxylic acid. Examples of the trivalent or higher-valent and hexavalent or lower-valent carboxylic acid compound include trimellitic acid, 2,5,7-naphthalenetricarboxylic acid, and pyromellitic acid. In the case of including a polyvalent carboxylic acid, from the viewpoint of controlling physical properties, a monohydric alcohol may be appropriately contained in the alcohol component, and a monovalent carboxylic acid compound may be appropriately contained in the carboxylic acid component.

From the viewpoint of not only enhancing melt-dispersibility in the asphalt but also obtaining excellent rutting resistance and cracking resistance, it is preferred that an aromatic dicarboxylic acid compound is included as the carboxylic acid component. The content or blending amount of the aromatic dicarboxylic acid compound is preferably 60 mol % or more, and more preferably 75 mol % or more, and it is preferably 100 mol % or less, more preferably 99 mol % or less, and still more preferably 95 mol % or less, in 100 mol % of the carboxylic acid component.

From the viewpoint of enhancing flexibility of the polyester to improve the rutting resistance and the cracking resistance, an aliphatic dicarboxylic acid compound may be included as the carboxylic acid component. In the case where the carboxylic acid component includes an aliphatic dicarboxylic acid compound, the content or blending amount of the aliphatic dicarboxylic acid compound is preferably 1 mol % or more, and more preferably 5 mol % or more, and it is preferably 40 mol % or less, and more preferably 25 mol % or less, in 100 mol % of the carboxylic acid component.

Molar Ratio of Carboxylic Acid Component-Derived Structural Unit to Alcohol Component-Derived Structural Unit From the viewpoint of controlling an acid value, a molar ratio of the carboxylic acid component-derived structural unit to the alcohol component-derived structural unit [(carboxylic acid component)/(alcohol component)] is preferably 0.7 or more, and more preferably 0.8 or more, and it is preferably 1.5 or less, more preferably 1.3 or less, and still more preferably 1.1 or less.

Physical Properties of Polyester

From the viewpoint of obtaining the rutting resistance and the cracking resistance, a softening point of the polyester is preferably 80° C. or higher, more preferably 90° C. or higher, and still more preferably 100° C. or higher, and it is preferably 140° C. or lower, more preferably 130° C. or lower, still more preferably 125° C. or lower, yet still more preferably 120° C. or lower, and even yet still more preferably 115° C. or lower.

From the viewpoint of promoting absorption onto the aggregate and more improving the rutting resistance and the cracking resistance, an acid value of the polyester is preferably 1 mgKOH/g or more, more preferably 2 mgKOH/g or more, and still more preferably 3 mgKOH/g or more, and from the viewpoint of enhancing water resistance of the paved surface, the acid value of the polyester is preferably 30 mgKOH/g or less, more preferably 20 mgKOH/g or less, and still more preferably 18 mgKOH/g or less.

From the viewpoint of more improving the rutting resistance and the crack resistance, a hydroxyl value of the polyester is preferably 1 mgKOH/g or more, more preferably 2 mgKOH/g or more, still more preferably 5 mgKOH/g or more, and yet still more preferably 10 mgKOH/g or more, and it is preferably 70 mgKOH/g or less, more preferably 50 mgKOH/g or less, still more preferably 30 mgKOH/g or less, and yet still more preferably 25 mgKOH/g or less.

From the viewpoint of obtaining the rutting resistance and the cracking resistance and the viewpoint of improving the flowability resistance at a high temperature, a glass transition point of the polyester is 40° C. or higher, and more preferably 45° C. or higher, and it is 80° C. or lower, more preferably 75° C. or lower, and still more preferably 70° C. or lower.

From the viewpoint of obtaining the rutting resistance and the crack resistance, a weight average molecular weight of the polyester is preferably 10,000 or more, more preferably 12,000 or more, and still more preferably 14,000 or more, and it is preferably 35,000 or less, more preferably 32,000 or less, and still more preferably 30,000 or less. In the present invention, the weight average molecular weight of the polyester refers to a volume resulting from measurement of a chloroform-soluble component, and specifically, it is a value measured by the method expressed in the section of Examples.

The softening point, the acid value, the hydroxyl value, the glass transition point, and the weight average molecular weight can be measured by the methods described in the section of Examples. The softening point, the acid value, the hydroxyl value, the glass transition point, and the weight average molecular weight can be controlled according to a raw material monomer composition, a molecular weight, a catalyst amount, or a reaction condition.

In the present invention, the polyester includes not only an unmodified polyester, but also a modified polyester obtained by modifying a polyester to such an extent that substantially no adverse influence is exerted on properties of the polyester. As the modified polyester, there may be mentioned those grafted or blocked polyesters obtained by grafting or blocking the polyester with phenol, urethane, epoxy, etc., by the methods described, for example, in JP 11-133668A, JP 10-239903A and JP 8-20636A, and composite resins containing two or more kinds of resin units including a polyester unit, etc.

Production Method of Polyester

Although a method for producing the polyester is not particularly limited, for example, the polyester can be produced by subjecting the alcohol component and the carboxylic acid component as mentioned above to polycondensation.

Although a temperature of the polycondensation reaction is not particularly limited, it is preferably 160° C. or higher and 260° C. or lower from the viewpoint of reactivity.

From the viewpoint of rutting resistance and cracking resistance, for the polycondensation reaction, a tin(II) compound not having an Sn—C bond, such as tin(II) di(2-ethylhexanoate), may be used as a catalyst in an amount of preferably 0.01 parts by mass or more, and more preferably 0.2 parts by mass or more, and it is preferably 1.5 parts by mass or less, and more preferably 0.6 parts by mass or less, based on 100 parts by mass of a total amount of the alcohol component and the carboxylic acid component.

From the viewpoint of rutting resistance and cracking resistance, for the polycondensation reaction, in addition to the catalyst, a pyrogallol compound, such as gallic acid, may be used as an esterification catalyst in an amount of preferably 0.001 parts by mass or more, more preferably 0.005 parts by mass or more, and still more preferably 0.01 parts by mass or more, and it is preferably 0.15 parts by mass or less, more preferably 0.10 parts by mass or less, and still more preferably 0.05 parts by mass or less, based on 100 parts by mass of a total amount of the alcohol component and the carboxylic acid component.

Ratio of Polyester

In the asphalt composition of the present invention, from the viewpoint of improving the rutting resistance and the cracking resistance, a ratio of the polyester is preferably 0.5 parts by mass or more, and more preferably 2 parts by mass or more, and from the viewpoint of workability, the ratio of the polyester is preferably 30 parts by mass or less, more preferably 25 parts by mass or less, still preferably 16 parts by mass or less, yet still more preferably 10 parts by mass or less, and yet still more preferably 8 parts by mass or less, based on 100 parts by mass of the asphalt.

Dispersant

From the viewpoint of more improving the rutting resistance and the cracking resistance, the asphalt composition may include a dispersant. The dispersant is preferably one capable of being dissolved in the asphalt and having affinity with the polyester. Examples of the dispersant include polymer dispersants and surfactants, such as polyoxyethylene alkylamines and alkanolamines.

Examples of the polymer dispersant include a polyamide amine and a salt thereof, a polycarboxylic acid and a salt thereof, a high-molecular weight unsaturated acid ester, a modified polyurethane, a modified polyester, a modified poly(meth)acrylate, a (meth)acrylic copolymer, and a naphthalenesulfonic acid formalin condensate. These dispersants may be used alone or in combination of two or more thereof.

From the viewpoint of improving the high-temperature storage stability and more improving the rutting resistance and the cracking resistance, the dispersant is preferably a polymer dispersant. The "polymer dispersant" as referred to in the present invention means a dispersant having a weight average molecular weight of 1,000 or more. Although the weight average molecular weight varies with the polymer species, it is preferably 2,000 or more, and more preferably 4,000 or more, and it is preferably 80,000 or less, and more preferably 40,000 or less.

From the viewpoint of more improving the rutting resistance and the cracking resistance, the dispersant preferably has a basic functional group. The basic functional group means a group such that a pKa of a conjugate acid is −3 or more. Examples of the basic functional group include an amino group, an imino group, and a quaternary ammonium group. From the viewpoint of improving the high-temperature storage stability and more improving the rutting resistance and the cracking resistance, a base number of the dispersant is preferably 10 mgKOH/g or more, more preferably 20 mgKOH/g or more, and still more preferably 30 mgKOH/g or more, and it is preferably 150 mgKOH/g or less, more preferably 120 mgKOH/g or less, and still more preferably 100 mgKOH/g or less. As for the measurement method of the base number, the measurement is performed by the method prescribed in JIS K7237:1995.

Examples of the commercially available dispersant include "DISPER" Series "byk-101", "byk-130", "byk-161", "byk-162", "byk-170", "byk-2020", "byk-2164", and "byk-LPN21324" (all of which are manufactured by BYK Additives & Instruments); "SOLSPERSE" Series "9000", "11200", "13240", "13650", "13940", "17000", "18000", "24000", "28000", "32000", "38500", and "71000" (all of which are manufactured by Lubrizol Corp.); "AJISPER" Series "PB821", "PB822", "PB880", and "PB881" (all of which are manufactured by Ajinomoto Fine-Techno Co., Inc.); "EFKA" Series "46", "47", "48", "49", "4010", "4047", "4050", "4165", and "5010" (all of which are manufactured by BASF SE); "FLOWLEN TG-710" (manufactured by Kyoeisha Chemical Co., Ltd.); and "TAMN-15" (manufactured by Nikko Chemicals Co., Ltd.).

From the viewpoint of more improving the rutting resistance and the cracking resistance, the content of the dispersant is preferably 1 part by mass or more, more preferably 3 parts by mass or more, and still more preferably 4 parts by mass or more, and it is preferably 80 parts by mass or less, more preferably 60 parts by mass or less, still more preferably 40 parts by mass or less, yet still more preferably 30 parts by mass or less, and even yet still more preferably 20 parts by mass or less, based on 100 parts by mass of the polyester.

Although a production method of the asphalt composition is not particularly limited, it preferably includes a step of mixing the asphalt and the polyester.

The asphalt composition is obtained by heat melting the asphalt, adding the polyester and optionally, other additive, and then stirring and mixing using a usually used mixer until the respective components are uniformly dispersed. Examples of the usually used mixer include a homomixer, a disperser, a puddle mixer, a ribbon mixer, a screw mixer, a planetary mixer, a vacuum backflow mixer, a roll mill, and a twin-screw extruder.

From the viewpoint of uniformly dispersing the polyester in the asphalt and more improving the rutting resistance and the cracking resistance, a mixing temperature of the asphalt and the polyester is preferably 100° C. or higher, more preferably 130° C. or higher, still more preferably 160° C. or higher, and yet still more preferably 170° C. or higher, and it is preferably 230° C. or lower, more preferably 210° C. or lower, still more preferably 200° C. or lower, and yet still more preferably 190° C. or lower.

From the viewpoint of efficiently uniformly dispersing the polyester in the asphalt and more improving the rutting resistance and the cracking resistance, a mixing time of the asphalt and the polyester is preferably 0.1 hours or more, more preferably 0.5 hours or more, still more preferably 1.0 hour or more, and yet still more preferably 1.5 hours or more, and it is preferably 10 hours or less, more preferably 7 hours or less, still more preferably 5 hours or less, and yet still more preferably 3 hours or less.

The preferred content of the polyester relative to the asphalt is as mentioned above, Asphalt Mixture The asphalt mixture according to the embodiment of the present invention contains the aforementioned asphalt composition and the aggregate. Namely, the asphalt mixture contains the asphalt, the polyester, and the aggregate, and preferably contains the asphalt, the thermoplastic elastomer, the polyester, and the aggregate.

From the viewpoint of more improving the rutting resistance and the cracking resistance, the content of the asphalt composition in the asphalt mixture is preferably 2% by mass or more, more preferably 3% by mass or more, and still more preferably 4% by mass or more, and it is preferably 15% by mass or less, more preferably 10% by mass or less, and still more preferably 8% by mass or less, in 100% by mass of the asphalt mixture.

Aggregate

The aggregate can be, for example, optionally selected from crushed stone, cobble stone, gravel, sand, reclaimed aggregate, and ceramics, and used. In addition, as the aggregate, all of a coarse aggregate having a particle diameter of 2.36 mm or more and a fine aggregate having a particle diameter of less than 2.36 mm can be used.

Examples of the coarse aggregate include crushed stone having a particle diameter range of 2.36 mm or more and 4.75 mm or less, crushed stone having a particle diameter range of 4.75 mm or more and 12.5 mm or less, crushed stone having a particle diameter range of 12.5 mm or more and 19 mm or less, and crushed stone having a particle diameter range of 19 mm or more and 31.5 mm or less.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and reclaimed aggregate-crushed sand.

The aforementioned particle diameter is a value prescribed in JIS A5001:1995.

Of these, a combination of the coarse aggregate and the fine aggregate is preferred.

The fine aggregate may contain a filler having a particle diameter of less than 0.075 mm (for example, sand). Examples of the filler include sand, fly ash, calcium carbonate, and hydrated lime. Of these, calcium carbonate is preferred from the viewpoint of improving the dry strength and more improving the rutting resistance and the cracking resistance.

From the viewpoint of improving the dry strength and more improving the rutting resistance and the cracking resistance, the average particle diameter of the filler is preferably 0.001 mm or more, and it is preferably 0.05 mm or less, more preferably 0.03 mm or less, and still more preferably 0.02 mm or less. The average particle diameter of the filler can be measured by a laser diffraction particle size distribution analyzer. Here, the average particle diameter means an average particle diameter of 50% cumulative volume.

Measurement Method of Average Particle Diameter of Filler

The average particle diameter of the filler is a value measured by a laser diffraction particle size distribution analyzer "LA-950" (manufactured by HORIBA, Ltd.) under the following condition.

Measurement method: Flow method
Dispersion medium: Ethanol
Sample preparation: 2 mg/100 mL
Dispersing method: Stirring and 1 minute of built-in ultrasonic waves From the viewpoint of more improving the rutting resistance and the cracking resistance, a mass ratio of the coarse aggregate to the fine aggregate is preferably 10/90 or more, more preferably 20/80 or more, and still more preferably 30/70 or more, and it is preferably 90/10 or less, more preferably 80/20 or less, and still more preferably 70/30 or less.

From the viewpoint of more improving the rutting resistance and the cracking resistance, the content of the aggregate is preferably 1,000 parts by mass or more, more preferably 1,200 parts by mass or more, and still more preferably 1,400 parts by mass or more, and it is preferably 3,000 parts by mass or less, more preferably 2,500 parts by mass or less, and still more preferably 2,000 parts by mass or less, based on 100 parts by mass of a sum total of the asphalt and the polyester.

In the asphalt mixture, other components may be further blended, as the need arises.

The blending ratio of the asphalt in the conventional asphalt mixtures including the aggregate and the asphalt is in general adopted by referring to an optimum asphalt amount obtained from "Formulation and Design of Asphalt Mixture" as described in "Guideline for Pavement Design and Construction" published by Japan Road Association.

In this specification, the aforementioned optimum asphalt amount corresponds to the total amount of the asphalt, the thermoplastic elastomer, and the polyester. In consequence, in general, the total blending amount of the asphalt, the thermoplastic elastomer, and the polyester is preferably determined from the aforementioned optimum asphalt amount. However, it is not needed to limit the optimum asphalt amount to the method as described in "Guideline for Pavement Design and Construction", and it may also be determined by any other methods.

The description of the "Guideline for Pavement Design and Construction" is incorporated by reference in this specification.

Production Method of Asphalt Mixture

Although a method for producing the asphalt mixture of the present invention is not particularly limited, from the viewpoint of more improving the rutting resistance and the cracking resistance, a method including a step of mixing the heated aggregate, the asphalt, and the aforementioned polyester is preferred, and a method including a step of mixing the heated aggregate, the asphalt, the thermoplastic elastomer, and the aforementioned polyester is more preferred.

As the specific production method of the asphalt mixture, there is exemplified the conventional production method of an asphalt mixture which is called a plant mix method, a premix method, or the like. All of these methods are concerned with a method of adding the asphalt (and the thermoplastic elastomer, as the need arises) and the polyester to the heated aggregate. Examples of the addition method include a premix method in which the asphalt (and the thermoplastic elastomer, as the need arises) and the polyester are previously dissolved; and a plant mix method in which modified asphalt having the thermoplastic elastomer dissolved in the asphalt is added, and then, the polyester is charged. Of these, the premix method is preferred from the viewpoint of more improving the rutting resistance and the cracking resistance.

More specifically, in the production method of the asphalt mixture, the mixing step is preferably
(i) a method in which the asphalt (and the thermoplastic elastomer, as the need arises) is added to and mixed with the heated aggregate, and then, the polyester is added and mixed;
a method in which the asphalt (and the thermoplastic elastomer, as the need arises) and the polyester are simultaneously added to and mixed with the heated aggregate; or
(iii) a method in which a mixture of the asphalt (and the thermoplastic elastomer, as the need arises) and the polyester, which has been previously heated and mixed, is added to and mixed with the heated aggregate.

Of these, the method (iii) is preferred from the viewpoint of more improving the rutting resistance and the cracking resistance.

A mixing temperature when the asphalt and the polyester are previously mixed in the method (iii) is preferably a temperature higher than the softening point of the polyester and is preferably 130° C. or higher, more preferably 150° C. or higher, still more preferably 170° C. or higher, and yet still more preferably 180° C. or higher from the viewpoint of more improving the rutting resistance and the cracking resistance, and the foregoing mixing temperature is preferably 230° C. or lower, more preferably 210° C. or lower, and still more preferably 200° C. or lower from the viewpoint of preventing thermal degradation of the asphalt from occurring. From the viewpoint of more improving the rutting resistance and the cracking resistance, a mixing time is, for example, 10 minutes or more, preferably 30 minutes or more, more preferably 1 hour or more, still more preferably 2 hours or more. Although an upper limit of the mixing time is not particularly limited, it is, for example, about 5 hours.

A temperature of the heated aggregate in the methods (i) to (iii) is preferably a temperature higher than the softening point of the polyester and is preferably 130° C. or higher, more preferably 150° C. or higher, still more preferably 170° C. or higher, and yet still more preferably 180° C. or higher from the viewpoint of more improving the rutting resistance and the cracking resistance, and the foregoing mixing temperature is preferably 230° C. or lower, more preferably 210° C. or lower, and still more preferably 200° C. or lower from the viewpoint of preventing thermal degradation of the asphalt from occurring.

In the step of mixing, a mixing temperature is preferably a temperature higher than the softening point of the polyester and is preferably 130° C. or higher, more preferably 150° C. or higher, still more preferably 170° C. or higher, and yet still more preferably 180° C. or higher from the viewpoint of more improving the rutting resistance and the cracking resistance, and the foregoing mixing temperature is preferably 230° C. or lower, more preferably 210° C. or lower, and still more preferably 200° C. or lower from the viewpoint of preventing thermal degradation of the asphalt from occurring and more improving the rutting resistance and the cracking resistance. A mixing time in the mixing step is, for example, 30 seconds or more, preferably 1 minute or more, more preferably 2 minutes or more, and still more preferably 5 minutes or more, and though an upper limit of the mixing time is not particularly limited, it is, for example, about 30 minutes.

From the viewpoint of more improving the rutting resistance and the cracking resistance, the production method of the asphalt mixture preferably includes a step of, after the mixing step, holding the resulting mixture at a temperature equal to or higher than the softening point of the polyester.

In the holding step, though the mixture may be further mixed, the mixture may be held at a temperature equal to or higher than the aforementioned temperature.

In the holding step, the mixing temperature is preferably a temperature higher than the softening point of the polyester, and it is preferably 130° C. or higher, more preferably 150° C. or higher, still more preferably 170° C. or higher, and yet still more preferably 180° C. or higher, and from the viewpoint of preventing thermal degradation of the asphalt composition from occurring, the mixing temperature is preferably 230° C. or lower, more preferably 210° C. or lower, and still more preferably 200° C. or lower. A holding time in the holding step is preferably 0.5 hours or more, more preferably 1 hour or more, and still more preferably 1.5 hours or more. Although an upper limit of the time is not particularly limited, it is, for example, about 5 hours.

Road Paving Method

The asphalt mixture of the present invention is used for road pavement.

The road paving method preferably includes a step of laying the aforementioned asphalt mixture, thereby forming an asphalt paving material layer. Specifically, the road paving method preferably includes a step of mixing the asphalt, the aforementioned polyester, and the aggregate, thereby obtaining an asphalt mixture (step 1); and a step of laying the asphalt mixture obtained in the step 1 on a road, thereby forming an asphalt paving material layer (step 2). The asphalt paving material layer is preferably a base layer or a surface layer.

The asphalt mixture may be subjected to compacting laying using a known laying machine and the same laying method. In the case of using the asphalt mixture as the heated asphalt mixture, from the viewpoint of more improving the rutting resistance and the cracking resistance, a compacting temperature thereof is preferably a temperature higher than the softening point of the polyester, and it is preferably 100° C. or higher, more preferably 120° C. or higher, and still more preferably 130° C. or higher, and it is preferably 200° C. or lower, and more preferably 180° C. or lower.

In accordance with the present invention, an asphalt composition which makes it possible to achieve asphalt pavement in which the generation of both rutting and cracking is suppressed and an asphalt mixture can be provided.

EXAMPLES

Respective physical values of resins and the like were measured and evaluated by the following methods.

Measurement Method

Acid Value and Hydroxyl value of Polyester

An acid value and a hydroxyl value of a polyester were each measured on the basis of the method of JIS K0070: 1992. However, only the measuring solvent was changed from a mixed solvent of ethanol and diethyl ether as prescribed in JIS K0070:1992 to a mixed solvent of acetone and toluene (acetone/toluene=1/1 (volume ratio)).

Softening Point and Glass Transition Point of Polyester (1) Softening Point

Using a flow tester "CFT-500D" (manufactured by Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(2) Glass Transition Point

Using a differential scanning calorimeter "Q-100" (manufactured by TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, the measurement was performed while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

Weight Average Molecular Weight of Polyester

A molecular weight distribution was measured through the gel permeation chromatography (GPC) by the following method, thereby determining a weight average molecular weight Mw of a resin.

(1) Preparation of Sample Solution

A resin was dissolved in chloroform such that its concentration was 0.5 g/100 mL. Subsequently, this solution was filtered with a fluorine resin filter having a pore size of 2 μm ("FP-200", manufactured by Sumitomo Electric Industries, Ltd.) to remove an insoluble component, thereby preparing a sample solution.

(2) Measurement of Molecular Weight

Using the following device, chloroform as an eluting solution was flowed at a flow rate of 1 mL per minute, and a column was stabilized in a thermostat at 40° C. 100 μL of the sample solution was injected thereinto and then measured. The molecular weight of the sample was calculated on the basis of a previously prepared calibration curve. As for the calibration curve at this time, one prepared by using, as a standard sample, several kinds of monodispersed polystyrenes each having an already-known molecular weight ($2.63 \times 10^3$, $2.06 \times 10^4$, and $1.02 \times 10^5$, manufactured by Tosoh Corporation; and $2.10 \times 10^3$, $7.00 \times 10^3$, and $5.04 \times 10^4$, manufactured by GL Sciences Inc.) was used.

Measuring device: "CO-8010" (manufactured by Tosoh Corporation)

Analysis column: "GMH$_{XL}$"+"G3000H$_{XL}$" (all of which are manufactured by Tosoh Corporation)

Production Examples 1 to 7

Polyester Resins (A1) to (A6) and (a1))

In a 5 liter-volume four-necked flask equipped with a thermometer, a stainless steel-made stirring rod, a flow-down type condenser, and a nitrogen inlet tube, an alcohol component and terephthalic acid for a polyester, which are shown in Table 1, were charged, and 20 g of tin(II) di(2-ethylhexanoate) and 2 g of gallic acid were added in a nitrogen atmosphere. The temperature was raised to 235° C. over 3 hours in a mantle heater, and after the temperature reached 235° C., the contents were held for 7 hours. Then, the reaction was performed under reduced pressure at 8.0 kPa, followed by performing the reaction until reaching a softening point shown in the table. There were thus obtained the targeted Polyester Resins (A1) to (A6) and (a1).

TABLE 1

| | | | Production Example | | | | | | | |
|---|---|---|---|---|---|---|---|---|---|---|
| | | | 1 | | 2 | | 3 | | 4 | |
| | | | Resin | | | | | | | |
| | | | A1 | | A2 | | A3 | | A4 | |
| | | | Charged amount (g) | Molar ratio *1 | Charged amount (g) | Molar ratio *1 | Charged amount (g) | Molar ratio *1 | Charged amount (g) | Molar ratio *1 |
| Amount of raw material simple substance | Alcohol component | BPA-PO *2 | 1129 | 35 | 1242 | 38.5 | 806 | 25 | — | — |
| | | BPA-PO *3 | — | — | — | — | — | — | 1021 | 35 |
| | | BPA-EO *4 | 1625 | 60 | 1625 | 60 | 1625 | 60 | 1625 | 60 |
| | | PPG (Mw: 450) *5 | 188 | 5 | 56 | 1.5 | 563 | 15 | 188 | 5 |

TABLE 1-continued

|  |  |  | | | | | | | |
|---|---|---|---|---|---|---|---|---|---|
|  |  | PPG (Mw: 250) *5 | — | — | — | — | — | — | — | — |
|  |  | PPG (Mw: 900) *5 | — | — | — | — | — | — | — | — |
|  | Carboxylic acid | Terephthalic acid | 1314 | 95 | 1314 | 95 | 1314 | 95 | 1314 | 95 |
| Esterification catalyst | Tin(II) di(2-ethylhexanoate) | | 20 g | | 20 g | | 20 g | | 20 g | |
| Co-catalyst | Gallic acid | | 2 g | | 2 g | | 2 g | | 2 g | |
| Physical properties | Softening point (° C.) | | 102.2 | | 103.5 | | 101.6 | | 103.1 | |
|  | Glass transition point (° C.) | | 53.2 | | 60.5 | | 39.6 | | 58.4 | |
|  | Weight average molecular weight Mw | | 20100 | | 15600 | | 28000 | | 18500 | |
|  | Acid value (mgKOH/g) | | 3.6 | | 3.2 | | 2.8 | | 2.9 | |
|  | Hydroxyl value (mgKOH/g) | | 20.3 | | 19.8 | | 18.9 | | 19.5 | |

| | | | Production Example | | | | | |
|---|---|---|---|---|---|---|---|---|
| | | | 5 | | 6 | | 7 | |
| | | | Resin | | | | | |
| | | | A5 | | A6 | | a1 | |
| | | | Charged amount (g) | Molar ratio *1 | Charged amount (g) | Molar ratio *1 | Charged amount (g) | Molar ratio *1 |
| Amount of raw material simple substance | Alcohol component | BPA-PO *2 | 1129 | 35 | 1129 | 35 | — | — |
| | | BPA-PO *3 | — | — | — | — | 1290 | 40 |
| | | BPA-EO *4 | 1625 | 60 | 1625 | 60 | 1625 | 60 |
| | | PPG (Mw: 450) *5 | — | — | — | — | — | — |
| | | PPG (Mw: 250) *5 | 104 | 5 | — | — | — | — |
| | | PPG (Mw: 900) *5 | — | — | 375 | 5 | — | — |
| | Carboxylic acid | Terephthalic acid | 1314 | 95 | 1314 | 95 | 1314 | 95 |
| Esterification catalyst | Tin(II) di(2-ethylhexanoate) | | 20 g | | 20 g | | 20 g | |
| Co-catalyst | Gallic acid | | 2 g | | 2 g | | 2 g | |
| Physical properties | Softening point (° C.) | | 102.6 | | 104.1 | | 101.1 | |
| | Glass transition point (° C.) | | 55.6 | | 51.4 | | 63.1 | |
| | Weight average molecular weight Mw | | 17000 | | 23600 | | 14000 | |
| | Acid value (mgKOH/g) | | 3.9 | | 3.1 | | 4.1 | |
| | Hydroxyl value (mgKOH/g) | | 20.8 | | 18.7 | | 21.5 | |

*1: Molar amount based on 100 mol of alcohol component (molar ratio)
*2: BPA-PO: Polyoxypropylene (2.8) adduct of bisphenol A
*3: BPA-PO: Polyoxypropylene (2.2) adduct of bisphenol A
*4 BPA-EO: Polyoxyethylene (2.2) adduct of bisphenol A
*5: PPG: Polypropylene glycol

Example 1

Asphalt Composition

In a 3-liter stainless steel vessel, 2,200 g of modified asphalt (PG76-22 Asphalt, manufactured by Ergon, Inc.) heated to 180° C. was charged as a binder mixture and stirred at 100 rpm, to which was then added 3.4 g of a dispersant "SOLSPERS 11200" (manufactured by Lubrizol Corp., a polymer dispersant having a basic functional group, base number: 37 mgKOH/g). Polyester Resin (A1) in an amount of 66 g (3 parts by mass based on 100 parts by mass of the asphalt) was gradually added, and the contents were stirred at 300 rpm for 2 hours, thereby preparing Asphalt Composition (AS-1).

Asphalt Mixture

Subsequently, 11 kg of an aggregate (see a composition of the aggregate as shown below) heated to 180° C. was charged in a mixer for asphalt and mixed at 180° C. for 60 seconds.

Subsequently, 550 g of the aforementioned Asphalt Composition (AS-1) was added and mixed in the mixer for asphalt for 2 minutes, thereby obtaining an asphalt mixture. The resulting asphalt mixture was stored at 180° C. for 2 hours, charged in a formwork of 300×300×50 cm, and then subjected to 25-rotation pressure processing at a temperature of 150° C. under a load of 0.44 kPa using a roller compactor (manufactured by Iwata Kogyosho, K. K.), thereby preparing a specimen.

Composition of Aggregate
No. 6 crushed stone: 50.9 parts by mass
Crushed sand 1: 10.4 parts by mass
Crushed sand 2: 22.1 parts by mass
Fine sand: 10.4 parts by mass
Stone dust: 6.2 parts by mass
Passing Mass %:
  Sieve opening 15 mm: 100% by mass
  Sieve opening 10 mm: 85.6% by mass
  Sieve opening 5 mm: 49.7% by mass
  Sieve opening 2.5 mm: 44.6% by mass
  Sieve opening 1.2 mm: 31.6% by mass
  Sieve opening 0.6 mm: 21.3% by mass
  Sieve opening 0.3 mm: 12.7% by mass
  Sieve opening 0.15 mm: 7.1% by mass

Examples 2 to 6 and Comparative Example 1

Asphalt Compositions (AS-2) to (AS-6) and (AS-a1) were prepared in the same manner as in Example 1, except that in Example 1, the kind of the polyester resin was changed as described in Table 2.

In addition, asphalt mixtures and specimens were obtained in the same manner as in Example 1, except that in Example 1, the Asphalt Composition (AS-1) was changed to the Asphalt Compositions (AS-2) to (AS-6) and (AS-a1), respectively.

Example 7

Asphalt Composition (AS-7) was prepared in the same manner as in Example 1, except that in Example 1, the addition amount of the dispersant "SOLSPERS 11200" was changed to 11.0 g, and the addition amount of the Polyester Resin (A1) was changed to 220 g (10 parts by mass based on 100 parts by mass of the asphalt).

In addition, an asphalt mixture and a specimen were obtained in the same manner as in Example 1, except that in Example 1, the Asphalt Composition (AS-1) was changed to the Asphalt Composition (AS-7).

Example 8

Asphalt Composition (StAS-1) was prepared in the same manner as in Example 1, except that in Example 1, the kind of the asphalt was changed to straight asphalt (PG64-22 Asphalt, manufactured by Ergon, Inc.).

In addition, an asphalt mixture and a specimen were obtained in the same manner as in Example 1, except that in Example 1, the Asphalt Composition (AS-1) was changed to the Asphalt Composition (StAS-1).

Comparative Example 2

Modified asphalt (PG76-22 Asphalt, manufactured by Ergon, Inc.) was used.

An asphalt mixture and a specimen were obtained in the same manner as in Example 1, except that in Example 1, the Asphalt Composition (AS-1) was changed to the modified asphalt (PG76-22 Asphalt).

Evaluation

Rutting Resistance: Wheel Tracking Test

Each of the aforementioned specimens was dipped in warm water set at 60° C. in a 60° C. thermostatic chamber; a wheel was reciprocated on the specimen at a rate of 15 times per minute using a wheel tracking tester (manufactured by Iwata Kogyosho, K. K., load: 1,370 N, iron wheel width: 47 mm, linear pressure: 291.5 N/cm); and a displacement was measured at the number of passes of 2,500. Other measurement condition followed the "B003 Wheel Tracking Test" described in "Pavement Survey and Test Method Handbook" of the Japan Road Association.

Cracking Resistance: I-FIT Test (Illinois Flexibility Index Test)

A cylindrical specimen having diameter of 150 mm and height of 160 mm was obtained by placing the asphalt mixture in Superpave Gyratory Compactor "HA-5000 Superpave GYR Gyratory" available from Humboldt Mfg. Co. and compacting the asphalt mixture. Two circular specimens having thickness of 50 mm were trimmed from the top and the bottom of the cylindrical specimen, and then four semi-circular specimens were obtained by dividing the circular specimens. A 15±1 mm deep and 1.5 mm wide notch was cut in the center of the base of the semi-circular specimens to obtain notched specimens. Prior to testing, the notched specimens were placed in a water bath for two hours at 25±0.5° C.

FI value was determined using I-FIT device "H-1351 Semicircular Bend Test Breaking Head" available from Humboldt Mfg. Co. The I-FIT device has been designed for use with the AASHTO TP124 and ASTM D8044 test methods. Immediately after removing the notched specimens from the water bath, positioning and testing of the specimens was conducted within 5±1 minutes to ensure that the specimen temperature is maintained. The load of 0.1 kN was applied monotonically at a rate of 50 mm/min until the measured load decreased to less than 0.1 kN. Fracture energy ($G_f$) and "the post-peak slope of the inflection point of the load vs. displacement curve" (m) were determined and used to calculate the FI value (Flexibility Index). The higher FI value is, the more excellent cracking resistance is.

Product of Reciprocal of Displacement and FI Value

A reciprocal of the displacement at the number of passes of 2,500 in the aforementioned wheel tracking test and the FI value in the aforementioned I-FIT were integrated. It is expressed that as a value of the product of reciprocal of displacement and the FI value is large, both suppression of the rutting and suppression of the cracking of the asphalt pavement can be made compatible with each other.

TABLE 2

| | Asphalt composition | Polyester | Content of polyester (parts by mass) *1 | Wheel tracking test Displacement at the number of passes of 2,500 (mm) *2 | Reciprocal of displacement (1/mm) | I-FIT FI value | Product of reciprocal and FI value |
|---|---|---|---|---|---|---|---|
| Example 1 | AS-1 | A1 | 3 | 3.5 | 0.29 | 5.6 | 1.60 |
| Example 2 | AS-2 | A2 | 3 | 4.2 | 0.24 | 5.2 | 1.24 |
| Example 3 | AS-3 | A3 | 3 | 6.5 | 0.15 | 5.8 | 0.89 |
| Example 4 | AS-4 | A4 | 3 | 7.2 | 0.14 | 4.1 | 0.57 |
| Example 5 | AS-5 | A5 | 3 | 7.9 | 0.13 | 3.8 | 0.48 |
| Example 6 | AS-6 | A6 | 3 | 7.6 | 0.13 | 5.3 | 0.70 |

TABLE 2-continued

|  | Asphalt composition | Polyester | Content of polyester (parts by mass) *1 | Wheel tracking test Displacement at the number of passes of 2,500 (mm) *2 | Reciprocal of displacement (1/mm) | I-FIT FI value | Product of reciprocal and FI value |
|---|---|---|---|---|---|---|---|
| Example 7 | AS-7 | A1 | 10 | 3.9 | 0.26 | 3.5 | 0.90 |
| Example 8 | StAS-1 | A1 | 3 | 5.1 | 0.20 | 3.6 | 0.71 |
| Comparative Example 1 | AS-a1 | a1 | 3 | 6.2 | 0.16 | 2.0 | 0.32 |
| Comparative Example 2 | PG76-22 | — | — | 10.8 | 0.09 | 1.8 | 0.17 |

*1: Content of polyester based on 100 parts by mass of asphalt (parts by mass)
*2: Test temperature: 60° C.

In the asphalt compositions of Comparative Examples 1 and 2 not containing the polyester including an alkylene oxide adduct of bisphenol A and an alkylene glycol compound having 3 or more carbon atoms, the numerical value of I-FIT is low, and the cracking resistance is insufficient. It may be considered that when the value of I-FIT is 3 or more, the asphalt composition is durable for practical use. That is, from comparison of Examples 1 to 6 with Comparative Examples 1 to 2, it is noted that in view of the fact that the asphalt composition contains a specified polyester, the durability of the paved surface after laying is excellent, and the rutting and the cracking can be suppressed.

From comparison of Examples 1 to 3, it is noted that even when the ratio of the polyoxyalkylene adduct of bisphenol A to the polypropylene glycol in the polyester varies, the rutting and the cracking can be suppressed. In particular, it is noted that among Examples 1 to 3, Example 1 in which the molar ratio of the polyoxyalkylene adduct of bisphenol A to the polypropylene glycol [(polyoxyalkylene adduct of bisphenol A)/(polypropylene glycol)] is 95/5 brings about the most excellent effects.

From comparison of Examples 1 and 4, it is noted that even when the amount of the polyoxypropylene adduct of bisphenol A in the polyester varies, the rutting and the cracking can be suppressed. In particular, it is noted that Example 1 in which the polyoxypropylene (2.8) adduct of bisphenol A is used brings about more excellent effects.

In addition, it is noted that as compared with Example 7 in which 10 parts by mass of the polyester is contained, Example 1 in which 3 parts by mass of the polyester is contained is excellent in the durability of the paved surface after laying and is able to more suppress the cracking. In addition, from comparison of Examples 1, 5, and 6, it is noted that as compared with Example 5 or 6 in which the molecular weight of the polypropylene glycol is 250 or 900, Example 1 in which the molecular weight of the polypropylene glycol is 450 is more excellent in the durability of the paved surface after laying and is able to more suppress the cracking. In addition, from Example 8, it is noted that not only in the case where the asphalt is modified asphalt, but also in the case where the asphalt is straight asphalt, the effects of the present invention are brought.

Having described the present invention as related to the present embodiments, it is our intention that the invention not be limited by any of the details of the description, unless otherwise specified, but rather be construed broadly within its spirit and scope as set out in the accompanying claims.

The invention claimed is:

1. An asphalt composition comprising asphalt, and a polyester and a thermoplastic elastomer, wherein
the polyester includes an alcohol component-derived structural unit including an alkylene oxide adduct of bisphenol A and an alkylene glycol compound having 3 or more carbon atoms exclusive of the alkylene oxide adduct of bisphenol A, and
wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

2. The asphalt composition according to claim 1, wherein the alkylene glycol compound is at least one selected from the group consisting of an alkylene glycol and a polyalkylene glycol.

3. The asphalt composition according to claim 1, wherein the alkylene glycol compound is at least one selected from the group consisting of propylene glycol and polypropylene glycol.

4. The asphalt composition according to claim 1, wherein the alkylene oxide adduct of bisphenol A is a compound represented by the following formula (I):

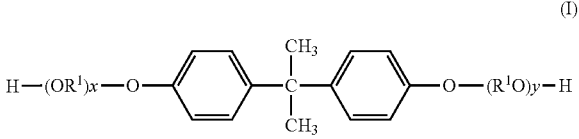

wherein $OR^1$ and $R^1O$ each represent an alkylene oxide; $R^1$ represents an alkylene group having 2 or 3 carbon atoms; x and y each represent a positive number expressing an average addition molar number of the alkylene oxide; and a sum total of x and y is 1 or more and 16 or less.

5. The asphalt composition according to claim 1, wherein the alcohol component includes 70 mol % or more and 98.5 mol % or less of the alkylene oxide adduct of bisphenol A and includes 1.5 mol % or more and 30 mol % or less of the alkylene glycol compound, in 100 mol % of the alcohol component.

6. The asphalt composition according to claim 1, wherein the content of the polyester in the asphalt composition is 0.5 parts by mass or more and 16 parts by mass or less based on 100 parts by mass of the asphalt.

7. The asphalt composition according to claim 1, wherein the polyester has a softening point of 80° C. or higher and 130° C. or lower and a glass transition point of 40° C. or higher and 80° C. or lower.

8. The asphalt composition according to claim 1, wherein a molecular weight of the alkylene glycol compound is 300 or more and 800 or less.

9. The asphalt composition according to claim 1, wherein a propylene oxide adduct of bisphenol A is included as the alkylene oxide adduct of bisphenol A, and an average addition molar number of propylene oxide in the propylene oxide adduct of bisphenol A is 2.0 or more and 3.0 or less.

10. An asphalt mixture comprising the asphalt composition according to claim 1 and an aggregate.

* * * * *